Patented Oct. 21, 1924.

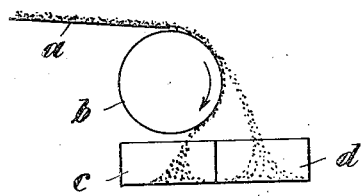
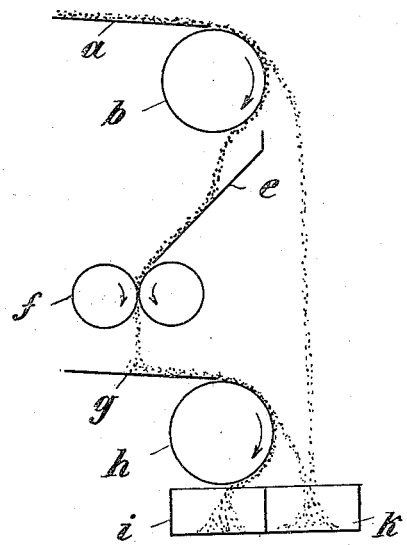

1,512,870

UNITED STATES PATENT OFFICE.

GEORG ULLRICH, FRANZ GRUESSNER, AND HANS DYCK, OF MAGDEBURG, GERMANY, ASSIGNORS TO FRIED. KRUPP AKTIENGESELLSCHAFT GRUSONWERK, OF MAGDEBURG-BUCKAU, GERMANY, A GERMAN CORPORATION.

METHOD OF RECOVERING FUEL FROM RESIDUES.

Application filed September 2, 1920. Serial No. 407,749.

*To all whom it may concern:*

Be it known that we, GEORG ULLRICH, FRANZ GRUESSNER, and HANS DYCK, citizens of the German Republic, residing at Magdeburg, Germany, have invented certain new and useful Improvements in Methods of Recovering Fuel from Residues, of which the following is a specification.

Our invention refers to the treatment of fuel residues resulting in working furnaces, boilers and the like, and its particular object is to recover from such residues the coke and coal still present therein in a more efficient and economical manner than has heretofore been possible.

As is well known the burnt residues from boilers, furnaces, etc., still contain a considerable percentage of coke and incompletely burnt coal. In order to recover these valuable constituents, a wet concentrating process carried out by means of jigging machines has hitherto been generally used. The burnt residues (ashes and slag) were first sifted out and worked up on jigging machines and by this means the slag separated from the coke and the coal according to their specific gravity. After the floating slag has been separated out from the coke product and the coal which has not yet been burned has been separated from the slag product by hand labor the products are passed over dehydrating sieves, in order to get rid of the water. The dirty water is run into two or three part settling tanks and subjected to a purifying process to enable it to be used over again.

The process which forms the subject matter of this invention not only requires less expense for plant and working but it insures above all things the recovery without any residue of the fuels contained in the burnt residues, no matter whether these are present in the form of coke or coal which has not yet been burned.

The invention is based on the idea, that the greatest part by far of the fuel residues which are no longer combustible, possess magnetic properties, which are explained by the fact that the fuel contains iron compounds to a small extent (e. g. pyrites and the like) which are converted in the fire into protoxide or sesquioxide or peroxide of iron and appear in the ashes and slag as silicates by fusion with $SiO_2$. These slags containing this small amount of iron are attracted and firmly retained in highly concentrated magnetic fields, while the unburnt coal and the coke remain unacted on by the magnetic fields. It is thus possible by passing the ashes through a highly concentrated magnetic field to recover the coal as a non-magnetic product and separate therefrom the constituents which contain the iron and are retained in the magnetic field.

Our invention therefore substantially consists in subjecting fuel residues to the action of highly concentrated magnetic fields, such as by causing them to pass through such fields, thereby separating the fuel still contained in such residues from the incombustible slag.

Apart from the great reduction of the cost of the plant required and the working in general the new process has the following advantages:—

The unburnt coal is recovered together with the coke. Even the finest material can be treated and the fuel contained therein easily recovered.

The new process permits of the recovery of the coke and unburnt coal in an easy and cheap way from all ash and slag wastes from all industrial works, railways, shipping and even from house refuse.

As the magnetic separation can be carried out in the dry way, the apparatus required for carrying out the new process consists only, in addition to a disintegrating apparatus which may perhaps be necessary, of the magnetic separator.

Notwithstanding the low amount of iron in the ash it is possible by the aid of specially powerfully concentrated magnetic fields to separate all slags which contain iron from the non-magnetic fuels.

In the case of slag in large pieces it may happen that in the slags containing iron, which in the magnetic separation pass away as magnetic material, there are still contained fuel, coke and particles of coke, which are either enclosed in the pieces of slag or are fused thereto. In order to recover this fuel also, the slag which has already been separated as magnetic material is ground and the ground material thus obtained again passed through a highly concentrated magnetic field. By this means the fuel previously enclosed in the slag is obtained in a meally form as a non-magnetic product, while the slag meal passes away as a magnetic product. In order to make it utilizable for combustion the fuel may then be briquetted together with fine fuel obtained in the first process of about 8 mm. size of grain or it may be also ground so finely as to be capable of use for furnaces fired by coal dust. The slag meal is used as building sand or else briquetted into building stones. In this process the repeated separation has the advantage that by the separation of the fuel still adhering to the slag after the first separation the strength and consequently the value of the building stones thus obtained are materially increased.

In the drawings affixed to this specification and forming part thereof the novel method is illustrated diagrammatically, Fig. 1 being a diagram illustrating one, and Fig. 2 a diagram illustrating another modification.

Referring to the drawings, $a$ (Fig. 1) is a plate guiding the fuel residues onto a rotary magnetic separator $b$ which attracts the magnetic particles and carries them out of reach of the magnetic field to discharge them into a container $c$, while the non-magnetic carbon or coke particles are thrown off at once to be collected in the container $d$.

The modification disclosed in Fig. 2 is distinguished from the one described above by the magnetic particles which had been attracted by the separator drum, falling onto a trough or chute $e$ conducting them between a pair of cylinders $f$ or the like where they are ground to meal. The finely powdered material then drops onto an inclined plate leading to another magnetic separator $h$ acting after the manner of the first one and causing the non-magnetic particles to collect in the container $k$, which had already received the non-magnetic particles dropping off the first separator drum $b$, while the finely ground magnetic material is collected in the container $i$.

Although in the drawings the rotary type of separator is shown, we wish it to be understood that we may as well employ any other type of separating device, preferably one having the most powerful magnetic field available.

We claim:

1. The method of separating the ashes from the unconsumed carbon constituent of the combustion residues of ferriferous fuels consisting in subjecting the residues to the action of a highly concentrated magnetic field.

2. The method of separating the ashes from the unconsumed carbon constituent of the combustion residues of coal and coke consisting in subjecting the residues to the action of a highly concentrated magnetic field.

3. The method of separating the ashes from the unconsumed carbon constituent of the combustion residues of coal and coke consisting in passing the residues through a highly concentrated magnetic field.

4. The method of treating the combustion residues of coal and coke consisting in magnetically separating the ashes from the unconsumed carbon constituent of the residues, pulverizing said ashes and subjecting them to the action of a highly concentrated magnetic field.

In testimony whereof we affix our signatures.

GEORG ULLRICH.
FRANZ GRUESSNER.
HANS DYCK.